Patented May 31, 1932

1,861,200

UNITED STATES PATENT OFFICE

CHARLES S. WEBBER AND CYRIL J. STAUD, OF ROCHESTER, NEW YORK, ASSIGNORS TO EASTMAN KODAK COMPANY, OF ROCHESTER, NEW YORK, A CORPORATION OF NEW YORK

PROCESS FOR THE MANUFACTURE OF MIXED ESTERS OF CELLULOSE AND THE PRODUCT THEREOF

No Drawing.  Application filed August 2, 1929.  Serial No. 383,147.

This invention relates to a process for the manufacture of mixed organic esters of cellulose containing two or more different acid groups each combined with the cellulose.

There have been a limited number of organic esters of cellulose which have found commercial uses. Cellulose acetate has been known for a number of years and since the work of Miles, in which the triacetate was hydrolyzed to a solubility in acetone, it has been extensively used both in the manufacture of motion picture film and artificial cellulose acetate silk. In recent years, due to the ability of the manufacturer to increase the solubility of the acetate in suitable solvents, its use in lacquers has also become of importance. In every instance, in the use of of cellulose acetate and other esters of cellulose, the extent of its use is restricted by its degree of solubility. It has been the desire, therefore, of workers in this art to obtain, if possible, esters of cellulose, and particularly organic esters of cellulose, having solubilities which would extend their usefulness to other fields.

Owing to the inability of the known single organic esters of cellulose to meet the requirements of solubility, or other physical or chemical properties mixed esters of cellulose containing two different organic acid radicals combined with the cellulose molecule have been devised. In French Patent 435,507 of the Aktien-Gesellschaft fur Anilin-Fabrikation a cellulose aceto-benzoate is described. This mixed ester of cellulose is obtained by conducting the esterification of the cellulose in a bath containing a mixture of the anhydrides of acetic and benzoic acids. Cross and Bevan in their extended researches on the constitution and derivatives of cellulose obtained by the acetylation of cellulose formate a cellulose diacetyl monoformate. These esters, to our knowledge were never of any commercial utility.

The object of the present invention is to provide a process for the manufacture of mixed esters of cellulose which have unexpected qualities and which have particularly exceptional solubilities in various solvents. Another object will include a process for the preparation of these esters both with and without an added solvent. Other objects will hereinafter appear.

We have found that these desirable mixed esters of cellulose can be produced by heating or digesting an organic ester of cellulose with a suitable organic acid which is capable of displacing and substituting the acid which is combined with the cellulose. This substitution may be made in any of the usual organic esters of cellulose such, for example, as the cellulose acetate, cellulose benzoate, cellulose butyrate, etc., by many organic acids having particular characteristics which will hereinafter be discussed.

This substitution reaction appears to be an exchange of the organic radical combined with the cellulose for the radical of the reacting acid. It is well known to those versed in this art that a cellulose molecule consists of aggregations, the simplest unit of which is represented by the empirical formula $(C_6H_{10}O_5)$ or some multiple thereof. It is also known that for each $(C_6H_{10}O_5)$ unit there are three hydroxyl groups that may be esterified by many of the usual methods of esterification and particularly, by acetylation. In the following equation illustrating the substitution, the first symbol represents that portion of the $C_6H_{10}O_5$ that has combined with organic acid radicals, one of which has been hydrolyzed off. The remainder of the hypothetical molecule is omitted for clarity, the R representing an organic radicle which will be subsequently discussed.

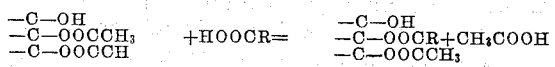

The reaction may be reversible, but the equilibrium is far to the right, especially under the conditions in which the cellulose ester is dissolved in the reacting acid, which is in large excess, and, therefore, the formation of the mixed ester of cellulose is favored. The theory stated here or hereinafter is given primarily to more clearly explain our process for the esterification of mixed esters of cellulose and whether or not it be correct is, of course, immaterial to successful working of our invention. The examples and process as will hereinafter be described will teach operable methods for the manufacture of these esters.

It is well known that certain groups in the structure of an organic acid have a marked effect on the reactivity of the acid which may be indicated by the ionization constant of the acid. In the preceding equation, the organic radicle of the acid is represented by R. The nature of this radical determines whether or not it will substitute in an organic ester of cellulose and it also influences the ionization constant to approximately the same degree. For instance, the presence of certain groups, such as —C=O, CN, OH, O, phenyl —C=C—, COOH, $NO_2$ NOH and the halogens, all tend to increase the ionization constant and hence the activity, of the organic acid, and its ability to substitute for a weaker acid. The nearer these groups are to the reacting carboxyl group, the greater will be their influence on increasing the rate of substitution and on the increase in the numerical value of the ionization constant. As these groups are more and more removed from the carboxyl group, the ability of the acid to substitute in the cellulose ester falls off until the substitution may become very slight or even negligible.

There are several chemical and physical properties which limit the ability of an acid to substitute for the esterifying group in the cellulose. These limitations may be grouped as follows:

1. The organic acid should preferably be a a solvent for the cellulose derivative.

2. The acid either must be in a liquid state at the temperature of the reaction or must be sufficiently soluble in a solvent, in the presence of which, the reaction can be readily conducted.

3. The reactivity of the organic acid must be greater than that of the acid combined with the cellulose,—i. e., its ionization constant, which is a measure of its reactivity, must be greater than the ionization constant of the acid which it is desired to replace.

The acids which we have found that comply with the above limitations may be considered under the following groups. A number of aliphatic organic acids having an ionization constant greater than that of the acid corresponding to the ester have been tried. We have covered, in our copending application, Serial No. 341,032, acids which are particularly well suited for substituting in acylesters but may also be used for substitution in other esters of cellulose providing of course, that its activity be sufficiently high. These acids include the alpha hydroxy aliphatic acids including lactic, tartaric, racemic, malic, glycollic and glyceric. In our copending application, Serial No. 342,668, we have described the use of alpha and gamma ketonic acids for this purpose, disclosing particularly pyruvic, alpha-keto-butyric, alpha-keto-valeric, alpha-keto-caproic and levulinic. In the present application the dicarboxylic esters and particularly the aliphatic organic dicarboxylic esters will be specifically covered. Among these latter acids we have found suitable oxalic, malonic, succinic, glutaric, and adipic.

The remaining acids of this group are much less reactive and while they will substitute to form a mixed ester, their use is not particularly desirable.

The aromatic acids which we have found capable of forming this substitution are disclosed and claimed in our copending application, Serial No. 383,148, filed at even date, with this application. The aromatic acids disclosed therein which we have found suitable for this purpose include specifically, the ortho meta and para toluic acids, benzoic acid and mandelic acid. The unsaturated acids have likewise been found capable of substitution for part of the ester in the cellulose ester molecule and particularly the aliphatic unsubstituted acid maleic performs this reaction with avidity, while cinnamic, and acrylic are also suitable.

In the preparation of these mixed esters of cellulose, the starting material generally consists of a fully esterified cellulosic compound,—that is, for example, a cellulose triacetate, celulose formate, cellulose butyrate, cellulose benzoate, etc. In the manufacture, however, of these esters using cellulose acetate as a starting material, it is often found advantageous in order to obtain a mixed ester having particular solubilities to start with the cellulose acetate in a partially hydrolized condition. For instance, the acetone soluble cellulose acetate containing approximately 39% acetyl has proven to be very suitable for this purpose. Cellulose acetates having greater or less degree of hydrolyzation may likewise be used, as is more thoroughly illustrated in the examples given in this and our copending applications.

In a study of the above acids, which are liquid at room temperature or below 100° C., it will be noted that they are all solvents, particularly for the partially hydrolyzed or unhydrolyzed cellulose acetate. In fact, we have found no organic acid to date which is not a solvent for this ester of cellulose. We have discovered as a result of this solubility that any organic acid which is a solvent for cellulose acetate and which has a higher reactivity than acetic acid will substitute in the cellulose acetate molecule for a portion at least of acetyl groups.

We have found that the organic acids which are not liquid at the temperature, which we have found suitable for the reaction, may also be used by dissolving them in a suitable solvent which does not in any way interfere with the substitution reaction.

In some instances water has been found suitable as a dissolving substance for these non-liquid acids, but any suitable solvent for the acid which at the temperature of the reaction does not deleteriously attack the cellulose ester, may be employed. We have found that 1—4 dioxan, propionic acid, and ethylene chlorid are particularly suitable, but there are numerous other solvents which may be employed without in any way departing from this invention. This solvent or diluent should only be present in sufficient quantity to dissolve the reacting substances in order to obtain the most favorable conditions for the reactions. While, of course, it is entirely possible to further dilute the substituting acid if it be so desired, and still bring about the displacement in the cellulose derivative, the time for completing the displacement will, however, be more or less extended.

The addition of water to the substituting acid in addition to its solvent properties, greatly enhances the ability of the acid, in many instances, to displace the esterifying group which is combined with the cellulose. For instance, in the production of cellulose acetopyruvate, if the reaction is conducted in an 84% aqueous pyruvic acid solution, 25% pyruvyl will be introduced into the cellulose acetate molecule in six hours, whereas only 16% pyruvyl will combine with the cellulose acetate in twenty-five hours when a pure non-aqueous pyruvyl solution is used. However, a great loss of total combined acid is generally experienced when an aqueous bath is employed; nevertheless, in some cases, the presence of water is necessary for a very smooth substitution reaction which proceeds with much more difficulty if the water be not present. We have found that this addition of water is advantageous for example when maleic acid is used for the partial substitution of the acetyl groups in cellulose acetate. Malic acid does not react favorably with the cellulose acetate when it is anhydrous, but in the presence of water at 100° C. a very smooth substitution proceeds. Malic acid and others we have found to react much better in the presence of water.

The temperature required for carrying out this reaction is preferably about 100° C. We have found it advantageous to digest the cellulose acetate and the reacting acid or other ester in a suitable container submerged in a steam bath and maintained at about this temperature. A reflux condenser has been found advantageous to prevent loss of the more volatile substances in the reacting mixture. The temperature, of course, may be increased above 100° C., without markedly degrading the resulting products, but the temperature must not be increased to such an extent that a charring or complete breakdown of the cellulose results. The temperature likewise may be regulated below 100° C., but such regulation will considerably increase the time required for conducting the reaction without markedly increasing the quality of the products resulting therefrom. Pressure may likewise be used with a corresponding increase in the rate of reaction, using the above temperatures, but such an expedient is not necessary.

A measure of the ability of an acid to substitute for another acid which has combined with the cellulose molecule is, as has been heretofore stated, determined by the reactivity of the organic acid, which is measured by its ionization constant. It will be found that in the numerous examples of organic acids which have been hereinabove given, the ionization constants have varied from $2.7 \times 10^{-5}$ for levulinic acid to $1.3 \times 10^{-2}$ for malic acid. In substituting any of these acids, therefore, for acetyl groups in the cellulose acetate molecule, it is evident from the above discussion that the reaction will take place readily, as the ionization constant which is usually given for acetic acid is $1.82 \times 10^{-5}$ and as any or all of these acids have ionization constants greater than that of acetic acid.

They will, therefore, at least, partially substitute for the acetic acid in the cellulose acetate when digested in a solution therewith. While such acids as amino acetic acid appear to have a sufficient hydrogen ion concentration to bring about the hydrolysis of cellulose acetate under the conditions employed, yet because of their lower ionization constant, which in the case of amino acetic acid is given as $3.4 \times 10^{-10}$, there is not sufficient free energy in the acid to result in the displacement of combined acetic acid.

It has been further ascertained that the ionization constant of the acids decreases as the length of the hydrocarbon chain increases, and the reactivity of the acid in the substitution of the original ester in the cellulose appears to closely parallel this decrease in ionization. As an example of this may be cited the gamma ketonic acid, levulinic, in substituting it for part of the acetyl groups in cellulose acetate. Its ionization constant, as usually given, is $2.7 \times 10^{-5}$, which is not much higher than the value for acetic acid, $1.82 \times 10^{-5}$. The substitution reaction, therefore, in which levulinic is substituted for acetic acid, has been found to be much slower than in the case of pyruvic acid, which is an alpha ketonic acid having an ionization constant of $5.6 \times 10^{-3}$. The time of reaction for the levulinic acid being 100 times greater than that for the pyruvic acid reaction, which would be expected by a study of the ionization constants and an understanding of our discovery.

From these considerations, therefore, it is evident that all of the above listed organic acids may be substituted in any organic ester of cellulose in which the acid corresponding to the ester group in the cellulose has an ionization constant less than that of the substituting acid. The ionization constant which will hereinafter be used for acetic acid will be $1.82 \times 10^{-5}$ and for benzoic acid $7.2 \times 10^{-5}$. While these constants may not be strictly correct, they, nevertheless, will be a basis from which the ability of other acids whose ionization constants are rated on the same scale, to displace an acid in the cellulose having less activity may be determined.

In the manufacture of the mixed esters of cellulose containing a dicarboxylic acid radical, we believe that one carboxyl group only is attached to the cellulose. This appears to be due to space effects, commonly called steric-hindrances. It is believed that in an unsymmetrical dibasic acid, from the general hypothesis of the displacement of acid groups, that the carboxyl group which is the nearest to the activating groups, described above, is the one which combines with the hydroxyl grouping in the cellulose formerly occupied by the acetic acid. In the case of cellulose acetate, this belief is thought to be warranted further on the basis of the fact that in a dibasic acid the ionization constant of the more reactive hydrogen is higher than that of acetic acid, while that for the second hydrogen is lower.

With suitable control, of the duration of the reaction, mixed esters can be obtained having solubilities varying from acetone to water solubility as extremes. In many instances, it may be desirable, to use for particular purposes, other available solvents. We have therefore, found numerous solvents for those esters which have different degrees of hydration and/or substitution. In the manufacture of mixed esters containing acetyl groups, part of which has been substituted by an alpha hydroxy or alpha or gamma ketonic acid, the mixed esters, suitably hydrolyzed, are soluble in 75% aqueous ethanol, 50% aqueous ethanol, or mixtures of the chlorides of ethane, ethylene or acetylene with other aliphatic or aromatic alcohols which are non-solvents for cellulose acetate are likewise solvents for mixed esters of cellulose containing both acetyl and alpha hydroxy or alpha or gamma ketonic acyl radical. These mixed esters, of course, are much less hydrated than the water soluble and alcohol-soluble mixed esters mentioned above.

Other solvents for cellulose mixed esters containing both an acetyl and an alpha hydroxy or alpha and gamma ketonic acyl radicals are: the cresols, phenol, formanilide, acetanilide and pyridine. Also aqueous mixtures containing the following percentages of the organic solvent by volume: 1–90% acetone, 1–90% diacetin, 1–50% ethylene glycol, 1–75% ethanol, 1–75% methanol, 1–50% propanol, 1–100% pyridine, 1–100% phenol, 1–100% cresol, 1–90% triethanolamine, 1–100% 1—4 dioxan, and, in fact, all organic liquids which we have tested that are both miscible with or highly soluble in water, will dissolve these cellulose mixed esters and especially the more hydrated and substituted members. Many of these solvents are likewise applicable as solvents for the other mixed esters of cellulose, either aromatic or aliphatic esters containing the organic acids hereinabove described which have been substituted in the ester for part of the esterifying group. It will, of course, be distinctly understood that while these liquids or liquid mixtures are designated as generally solvents for our mixed cellulose esters, that they are not solvents necessarily of every possible hydrated form of these esters.

In our copending applications we have given a number of examples for the preparation of these mixed esters. In them will be found examples for the manufacture of esters in which there has been substituted for the esterifying group in the cellulose, alpha hydroxy or alpha or gamma ketonic aliphatic acids, and aromatic acids, such as toluic acids. We will give below several examples for the general process as herein disclosed, including the aliphatic organic acids and the unsaturated acids, but it will be understood that we shall not be restricted to the specific proportions or other details as therein given except as may be indicated in the appended claims.

*Example I.*—10 grams of acetone-soluble cellulose acetate are dissolved in 75 cc. of 1—4 dioxan solution containing 10 grams of oxalic acid $(C_2O_4H_2.2H_2O)$. The solution is heated by steam under a reflux condenser in a suitable flask for 2 hours. The product will be found to be soluble in 1—4 dioxan and, on pouring the whole reaction mixture into acetone, a filamentatious precipitate will result. Upon washing in acetone until free from the acid, a product will be obtained which is soluble in water, 50% aqueous ethanol and 75% aqueous ethanol.

*Example II.*—Twenty grams of acetone soluble cellulose acetate containing approximately 39% acetyl are digested in a suitable container having an air reflux condenser attached thereto for 69 hours at approximately 100° C., with 100 cc. of 1—4 dioxan in which has been dissolved ten grams of tartaric acid. The product, on being precipitated in acetone and washed with acetone until free from the reacting substances is soluble in mixtures of acetone and water.

*Example III.*—Fifty grams of acetone soluble cellulose acetate are dissolved in 250 cc. of 1—4 dioxan solution containing 50 cc. of 85% lactic acid. The resulting solution is heated in a steam bath under reflux for 89 hours. Upon precipitation and washing with acetone the product was soluble in acetone and water mixtures and contained both acetyl and lactyl groups.

*Example IV.*—Fifty grams of cellulose acetate containing 33% acetyl and which is insoluble in acetone, on being dissolved in a mixture of 50 cc. of 85% lactic acid in 200 cc. of 1—4 dioxan and subsequently heating on a steam bath in a suitable container to approximately 100° C. for 94 hours will produce a cellulose acetate lactate which upon being precipitated and washed with acetone results in a product which is found to be soluble in 50% aqueous alcohol.

*Example V.*—Fifty grams of acetone insoluble cellulose acetate containing 33% acetyl are dissolved in a mixture of 50 cc. of pure pyruvic acid in 200 cc. of 1—4 dioxan and after heating it at approximately 100° C. for 64½ hours the product became insoluble in a mixture of 1—4 dioxan and pyruvic acid and was found, on precipitation and washing, to be water soluble.

*Example VI.*—Fifty grams of cellulose triacetate are dissolved in 200 cc. of 1—4 dioxan solution containing 50 cc. of 85% lactic acid and after digestion under a reflux condenser at approximately 100° C. for 25½ hours a product was obtained which is soluble in acetone. Upon continued heating for 164½ hours an acetone insoluble product results.

*Example VII.*—Twenty grams of acetone insoluble cellulose acetate containing 33% acetyl are placed in a suitable flask, heated by steam under an air reflex condenser with 25 cc. of 85% lactic acid and 25 cc. of 1—4 dioxan. After 24 hours of this treatment the resulting mixed ester will be found to be soluble in 50% cold aqueous alcohol. After 68 hours heating at the same temperature a water soluble mixed ester will result. Upon precipitation of this final product in acetone and washing with the same non-solvent of the mixed ester a product is obtained in granular form.

*Example VIII.*—Forty-seven grams of maleic acid are dissolved in twenty grams of water at 100° C. To this solution may be added ten grams of cellulose acetate which has been partially hydrated and which may contain from 30 to 42% acetyl. After treatment for 45 minutes a water soluble product will be obtained. The resulting product may be precipitated by pouring the reacting solution into an ether-acetone mixture. After washing with acetone until no acid is found in the washing solution the new cellulose acetyl meleate will be found to contain approximately 16.7% maleic acid calculated from the free acidity of the ester.

Apparently from this only one of the carboxyl groups attaches itself to the cellulose radical. The ester will likewise contain approximately 7 to 7½% of acetyl.

*Example IX.*—Five grams of cellulose acetate containing 34.1% acetyl are mixed with twenty-five grams of 85% glyceric acid. A thick, stiff dough is formed which is heated to 100° C. in a suitable container. The heating is continued for 12½ hours at which time the product, upon precipitation in acetone and washing with the same solution until the washing solution is neutral to litmus, (when tested in an aqueous solution,) a clear product containing glyceryl and acetyl radicals which is water soluble is obtained.

*Example X.*—Ten grams of acetone soluble cellulose acetate containing 37.6% acetyl are dried at 105° C. and subsequently dissolved in fifty grams of C. P. pyruvic acid. The container which is preferably equipped with a reflux condenser is heated in a bath at a temperature of 100° C. for a period of 7 hours, and upon precipitation in an ether solution and washed by decantation with ether the resulting mixed ester will be found to be soluble in acetone and in chloroform alcohol. It is insoluble in 75% ethyl alcohol and in 50% aqueous ethanol. It gelatinizes in water and in 95% ethyl alcohol.

*Example XI.*—Five grams of cellulose tribenzoate is dissolved in a solution containing 25 cc. of pyruvic acid C. P. and 25 cc. of ethylene chloride at 100° C. and digested for 67 hours. Upon precipitation, in ether and washing in ethanol to neutrality a cellulose pyruvyl benzoate was obtained which was soluble in chloroform, ethylene chloride, ethylene chloride plus alcohol and chloroform plus alcohol and insoluble in 1—4 dioxan, acetone, benzol, and benzol ethanol. A qualitative test showed the presence of pyrudyl.

It is obvious from the extreme number of mixed esters of cellulose that may be obtained by our process that many variations in the equivalents used for the substituting acid or in the cellulose ester in which the substitution takes place, or in the manner of conducting this reaction may be made without in any way departing from the scope of this invention or sacrificing any of the advantages which are derived therefrom.

What we claim as new and desire to secure by Letters Patent is:

1. A process for the production of mixed esters of cellulose which comprises reacting upon an acyl ester of cellulose with an organic acid having an ionization constant greater than that of the acid corresponding to the acyl group in the ester, said reaction being conducted in a solution containing the organic acid.

2. A process for the production of mixed esters of cellulose which comprises reacting upon cellulose acetate with an organic acid having an ionization constant greater than $1.82 \times 10^{-5}$, said reaction being conducted in a solution containing the organic acid.

3. A process for the production of mixed esters of cellulose which comprises reacting upon hydrolyzed cellulose acetate with an organic acid having an ionization constant greater than $1.82 \times 10^{-5}$, said reaction being conducted in a solution containing the organic acid.

4. A process for the production of mixed esters of cellulose which comprises reacting upon an acyl cellulose with an organic acid having an ionization constant greater than that corresponding to the ionization constant of the acyl ester in the cellulose, said reaction being conducted in a liquid bath comprising the organic acid.

5. A process for the production of mixed esters of cellulose which comprises treating an acyl cellulose in a solution containing an organic acid having an ionization constant greater than that of the acid corresponding to the ester and 1—4 dioxan.

6. A process for the production of mixed esters of cellulose which comprises reacting upon cellulose acetate with an organic acid having an ionization constant greater than $1.82 \times 10^{-5}$, said reaction being conducted in a liquid bath comprising the organic acid.

7. A process for the production of mixed esters of cellulose which comprises treating cellulose acetate in a solution containing an organic acid having an ionization constant greater than $1.82 \times 10^{-5}$ and 1—4 dioxan.

8. A process for the production of mixed esters of cellulose which comprises treating a hydrolyzed cellulose acetate in a solution containing an organic acid having an ionization constant greater than $1.82 \times 10^{-5}$ and 1—4 dioxan.

9. A process for the production of mixed esters of cellulose which comprises reacting upon an acyl cellulose with an aliphatic acid having an ionization constant greater than that of the acid corresponding to the ester, said reaction being conducted in a solution containing the aliphatic acid.

10. A process for the production of mixed esters of cellulose which comprises reacting upon cellulose acetate with an aliphatic acid having an ionization constant greater than $1.82 \times 10^{-5}$, said reaction being conducted in a solution containing the aliphatic acid.

11. A process for the production of mixed esters of cellulose which comprises reacting upon hydrolyzed cellulose acetate with an aliphatic acid having an ionization constant greater than $1.82 \times 10^{-5}$, said reaction being conducted in a solution containing the aliphatic acid.

12. A process for the production of mixed esters of cellulose which comprises reacting upon an acyl cellulose with an aliphatic acid having an ionization constant greater than that of the acid corresponding to the ester, said reaction being conducted in a liquid bath comprising the aliphatic acid.

13. A process for the production of mixed esters of cellulose which comprises treating an acyl cellulose in a solution containing an aliphatic organic acid having an ionization constant greater than that of the acid corresponding to the ester and 1—4 dioxan.

14. A process for the production of mixed esters of cellulose which comprises reacting upon cellulose acetate with an aliphatic acid having an ionization constant greater than $1.82 \times 10^{-5}$, said reaction being conducted in a liquid bath comprising the aliphatic acid.

15. A process for the production of mixed esters of cellulose which comprises treating cellulose acetate in a solution containing an aliphatic organic acid having an ionization constant greater than $1.82 \times 10^{-5}$ and 1—4 dioxan.

16. A process for the production of mixed esters of cellulose which comprises treating hydrolyzed cellulose acetate in a solution containing an aliphatic organic acid having an ionization constant greater than $1.82 \times 10^{-5}$ and 1—4 dioxan.

17. A process for the production of mixed esters of cellulose which comprises reacting upon an acyl cellulose with oxalic acid in a solution containing oxalic acid.

18. A process for the production of mixed esters of cellulose which comprises reacting upon cellulose acetate with oxalic acid in a solution containing oxalic acid.

19. A process for the production of mixed esters of cellulose which comprises reacting upon hydrolyzed cellulose acetate with oxalic acid in a solution containing oxalic acid.

20. A process for the production of mixed esters of cellulose which comprises treating an organic ester of cellulose in a solution containing oxalic acid and 1—4 dioxan.

21. A process for the production of mixed esters of cellulose which comprises reacting upon an acyl cellulose with oxalic acid, said reaction being conducted in a liquid bath comprising oxalic acid.

22. A process for the production of mixed esters of cellulose which comprises treating an acyl cellulose in a solution containing oxalic acid and 1—4 dioxan.

23. A process for the production of mixed esters of cellulose which comprises reacting upon cellulose acetate with oxalic acid, said reaction being conducted in a liquid bath comprising oxalic acid.

24. A process for the production of mixed esters of cellulose which comprises treating cellulose acetate in a solution containing oxalic acid and 1—4 dioxan.

25. A process for the production of mixed esters of cellulose which comprises treating hydrolyzed cellulose acetate in a solution containing oxalic acid and 1—4 dioxan.

26. A process for the production of mixed esters of cellulose which comprises treating an acyl cellulose in a solution containing an organic acid having an ionization constant greater than that of the acid corresponding to the ester of the cellulose at approximately 100 degrees centigrade until the desired solubility is obtained.

27. A process for the production of mixed esters of cellulose which comprises treating cellulose acetate in a solution containing an organic acid having an ionization constant greater than $1.82 \times 10^{-5}$ at approximately 100 degrees centigrade until the desired solubility is obtained.

28. A process for the production of mixed esters of cellulose which comprises treating a hydrolyzed cellulose acetate in a solution containing an organic acid having an ionization constant greater than $1.82 \times 10^{-5}$ at approximately 100 degrees centigrade until the desired solubility is obtained.

29. Cellulose-aceto-oxalate.

30. Water soluble cellulose-aceto-oxalate.

31. A mixed ester of cellulose comprising an acyl ester of cellulose containing at least two acyl radicals one of which is an aliphatic acid radical having an ionization constant greater than $7.2 \times 10^{-5}$ and not less than two carbon atoms.

32. A mixed ester of cellulose comprising an acyl ester of cellulose containing at least two acyl radicals one of which is an oxalic acid radical.

33. A mixed ester of cellulose comprising an acyl ester of cellulose containing at least two organic acid radicals one of which is an organic acid radical having an ionization constant greater than $7.2 \times 10^{-5}$ and not less than two carbon atoms.

34. A mixed ester of cellulose comprising an acyl ester of cellulose containing at least two organic acid radicals one of which is an aliphatic organic acid radical having an ionization constant greater than $1.82 \times 10^{-5}$ and not less than two carbon atoms.

35. A mixed ester of cellulose comprising an acetyl ester of cellulose containing another organic acid radical having an ionization constant greater than $7.2 \times 10^{-5}$ and not less than two carbon atoms.

36. A mixed ester of cellulose comprising an acetyl ester of cellulose containing another aliphatic organic acid radical having an ionization constant greater than $1.82 \times 10^{-5}$ and not less than two carbon atoms.

37. A water soluble mixed ester of cellulose comprising an acyl ester of cellulose containing an aliphatic organic acid radical having in ionization constant greater than $1.82 \times 10^{-5}$ and not less than two carbon atoms.

38. A process for the production of mixed esters of cellulose which comprises reacting upon an acyl ester of cellulose under the influence of heat with an organic acid having an ionization constant greater than that of the acid corresponding to the ester, said reaction being conducted in a solution containing the organic acid.

39. A process for the production of mixed esters of cellulose which comprises reacting upon hydrolyzed cellulose acetate under the influence of heat with an organic acid having an ionization constant greater than $1.82 \times 10^{-5}$, said reaction being conducted in a solution containing the organic acid.

40. A process for the production of mixed esters of cellulose which comprises reacting upon an acyl ester of cellulose under the influence of heat with an organic acid having an ionization constant greater than that of the acid corresponding to the ester, said reaction being conducted in a liquid bath comprising the organic acid.

Signed at Rochester, New York this 31st day of July, 1929.

CHARLES S. WEBBER.
CYRIL J. STAUD.

Certificate of Correction

Patent No. 1,861,200.

May 31, 1932.

CHARLES S. WEBBER ET AL.

It is hereby certified that error appears in the printed specification of the above-numbered patent requiring correction as follows: Page 1, line 89, for "$-C-OOCCH$" first occurrence read $-C-OOCCH_3$; page 2, line 17, for "$NO_2NOH$" read $NO_2$, $NOH$; page 4, line 101, for the compound word "acetons-soluble" read *acetone-soluble*; page 5, lines 103 and 104, for the misspelled word "pyrudyl" read *pyruvyl*; and that the said Letters Patent should be read with these corrections therein that the same may conform to the record of the case in the Patent Office.

Signed and sealed this 23d day of August, A. D. 1932.

[SEAL.]

WM. A. KINNAN,
*Acting Commissioner of Patents.*